US 6,692,705 B2

(12) United States Patent
Gupta et al.

(10) Patent No.: US 6,692,705 B2
(45) Date of Patent: Feb. 17, 2004

(54) FOULING TOLERANT FIXED BED REACTOR WITH MULTI-TIER BYPASS DEVICE

(75) Inventors: Ramesh Gupta, Berkeley Heights, NJ (US); Salvatore Joseph Rossetti, Bernardsville, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/933,939

(22) Filed: Aug. 22, 2001

(65) Prior Publication Data

US 2002/0068027 A1 Jun. 6, 2002

Related U.S. Application Data

(63) Continuation-in-part of application No. 09/351,648, filed on Jul. 13, 1999.
(60) Provisional application No. 60/299,502, filed on Jun. 21, 2001.
(51) Int. Cl.[7] ................................. B01J 8/04; B01J 8/02
(52) U.S. Cl. ........................ 422/191; 422/193; 422/195; 422/211; 422/217; 422/220
(58) Field of Search .................. 422/217, 220, 422/191–195, 216, 176, 177

(56) References Cited

U.S. PATENT DOCUMENTS

| | | | |
|---|---|---|---|
| 3,146,189 A | 8/1964 | Kunreuther et al. | 208/146 |
| 3,431,084 A | 3/1969 | Forbes | 422/217 |
| 3,469,950 A | 9/1969 | Mackley | 422/220 |
| 3,509,043 A | 4/1970 | McMaster et al. | 208/213 |
| 3,524,731 A | 8/1970 | Effron et al. | 422/220 |
| 3,598,539 A * | 8/1971 | Pizzato | 422/220 |
| 3,607,000 A | 9/1971 | Beal et al. | 423/659 |
| 3,702,238 A | 11/1972 | Armistead et al. | 422/195 |
| 3,888,633 A | 6/1975 | Grosboll et al. | 422/217 |
| 3,992,282 A | 11/1976 | Grosboll et al. | 208/46 |
| 4,313,908 A | 2/1982 | Gupta | 422/111 |
| 4,330,505 A | 5/1982 | Gupta | 422/217 |
| 4,380,529 A | 4/1983 | Gupta | 422/220 |
| 4,385,033 A | 5/1983 | Gupta | 422/217 |
| 4,904,456 A | 2/1990 | Anderson | 422/220 |
| 5,160,513 A | 11/1992 | Koves | 95/90 |
| 5,670,116 A | 9/1997 | Gupta et al. | 422/191 |

* cited by examiner

Primary Examiner—Hien Tran
(74) Attorney, Agent, or Firm—Malcolm D. Keen

(57) ABSTRACT

The invention is directed to a multi-tier bypass apparatus for extending the operating life of fixed bed reactors. The multi-tier bypass may be disposed within a fixed catalyst bed to allow any fluid feedstock to bypass successive layers of the fixed catalyst bed as they foul. The invention also relates to an improved fixed bed reactor comprising the inventive multi-tier bypass and a method for extending the operating life of a fixed bed reactor.

6 Claims, 4 Drawing Sheets

US 6,692,705 B2

FOULING TOLERANT FIXED BED REACTOR WITH MULTI-TIER BYPASS DEVICE

REFERENCE TO COPENDING APPLICATION

The present application is a continuation-in-part of U.S. application Ser. No. 09/351,648 filed Jul. 13, 1999, entitled fouling tolerant fixed bed reactor. This application claims priority from U.S. Provisional Application Ser. No. 60/299,502. filed Jun. 21, 2001.

FIELD OF THE INVENTION

The present invention relates generally to methods and devices for extending the operating life of fixed bed reactors.

BACKGROUND OF THE INVENTION

In the operation of fixed bed reactors, the top of the bed often becomes fouled or plugged by the deposition of fouling materials (also referred to as particulates, particulate impurities, or foulants). Examples of fouling materials include organometallic compounds, polymeric materials, carbonaceous materials, organic particulates and inorganic particulates. The plugging of the bed results in increased pressure drop that may necessitate shutdowns, throughput reduction, and time consuming repairs and maintenance.

To overcome this problem, many methods have been devised that require equipping each reactor with more than one bed and bypassing a fouled bed. Examples of such methods are described in U.S. Pat. Nos. 3,509,043 and 4,313,908. One shortcoming of such methods is that they require an auxiliary bypassable bed. Thus, the above methods do not readily apply to single fixed bed reactors.

Other methods involve the use of trash baskets. For example, U.S. Pat. Nos. 3,992,282 and 3,888,633, describe a fixed catalyst bed reactor having a hollow trash basket made from a screen mesh material (or scale trap) that extends into the catalyst bed. Particulate impurities are removed from a fluid stream flowing into the fixed catalyst bed by the hollow trash basket.

While the trash baskets tend to remove fouling materials contained in the fluid feedstocks, they generally have only a small effect in minimizing pressure drop buildup due to fouling. This is partially because fouling materials plug the trash basket walls within a short period of time. Thus, the flow passage of the fluid feedstocks is occluded and the pressure drop begins to rise, though at a somewhat slower rate than if the trash baskets were not used. Generally, it is desirable to keep fixed bed reactors on stream without significant pressure drop buildup for a long time, very often for several years. Thus, the methods involving trash baskets do not provide adequate protection against pressure drop buildup, and other methods are needed to further extend the operating life of fixed bed reactors. Other problems are associated with existing methods for extending the operating life of fixed bed reactors, contactors and filters.

SUMMARY OF THE INVENTION

One aspect of the present invention relates to a multi-tier bypass device that can be readily added to a fixed bed reactor for extending the operating life of the reactor. The multi-tier bypasss device comprises a cage having a plurality of successive chambers that are in fluid communication with one another. Each chamber may have a plurality of perforations for allowing any bypass flow that enters the chamber to exit the chamber and enter a clean bed layer surrounding the chamber. Each chamber, except the last chamber in the cage, may also have a fluid communication device for allowing any bypass flow that enters a chamber that is surrounded with a fouled layer to pass into the next chamber. This process is repeated until the bypass flow enters the last chamber and exits from that chamber into the last unfouled layer of the bed through side and/or bottom perforations.

The multi-tier bypass device also may include a bypass tube in fluid communication with at least one chamber of the cage. The bypass tube may protrude from the cage above the fixed bed for bypassing an increasing amount of the feedstock around a fouled layer of the fixed bed. The bypass flow will pass through the bypass tube into a chamber of the cage and out from that chamber through the chamber perforations into a clean bed layer. The multi-tier bypass device effectively partitions a single bed in multiple layers corresponding generally to the number of chambers in the cage.

The present invention also relates to an improved fixed bed reactor comprising a fixed bed for transforming a feedstock flowing therethrough, and at least one multi-tier bypass device positioned in the fixed bed for allowing the feedstock flow to bypass successive layers of the fixed catalyst bed as they foul.

Yet another aspect of the invention is directed to a method for extending the operating life of a fixed bed reactor. The method comprises partitioning the fixed bed into a plurality of successive layers, introducing a hydrocarbon feedstock into the fixed bed and as each successive layer fouls, bypassing an increasing amount of the feedstock to the next layer of the fixed bed that is not fouled.

The invention will become better understood with reference to the following detailed description considered in conjunction with the accompanying drawings described below.

DETAILED DESCRIPTION OF THE INVENTION

An embodiment of the present invention finds particular applicability in connection with increasing the cycle life of fixed catalyst beds contained within hydroprocessing reactors in which a hydrocarbon or other feedstocks are processed during the carrying out of any one of a multitude of chemical reactions. However, the invention is not limited to fixed catalyst bed reactors, but it can also be applied to any fixed bed reactors.

For example, such reactors may be used for the conversion or treatment of hydrocarbon or chemical feedstocks in the presence of a vapor phase, such as hydrogen containing treat gas. More specific examples of reactors for which the present invention can be utilized may include those used for hydroconversion of heavy petroleum feedstocks to lower boiling point products; the hydrocracking of distillate boiling range feedstocks; and hydrotreating of various petroleum feedstocks, such as light hydrocarbons, naphtha and distillate boiling range streams. This invention is applicable to reactors having one or more catalyst beds but it is particularly useful for reactors having only one fixed catalyst bed, because it allows the bypassing of one or more fouled catalyst layers within a single fixed catalyst bed.

For example, the bypass device utilized herein can be particularly beneficial in preventing the fouling of a fixed catalyst bed utilized for contacting a stream of hydrocarbon feedstock with a conventional reforming or hydroprocessing catalyst. One embodiment of the bypass apparatus allows the feedstock to bypass the upper portion or top layer of the catalyst bed once fouling occurs, enabling the bed to be run for substantially longer periods of time as compared to running without the bypass apparatus. Another embodiment allows bypassing multiple successive layers of a single catalyst bed as each layer successively fouls. Existing reactors can be equipped readily with one or more bypass devices to enable them to run for longer periods of time.

Figure 1:
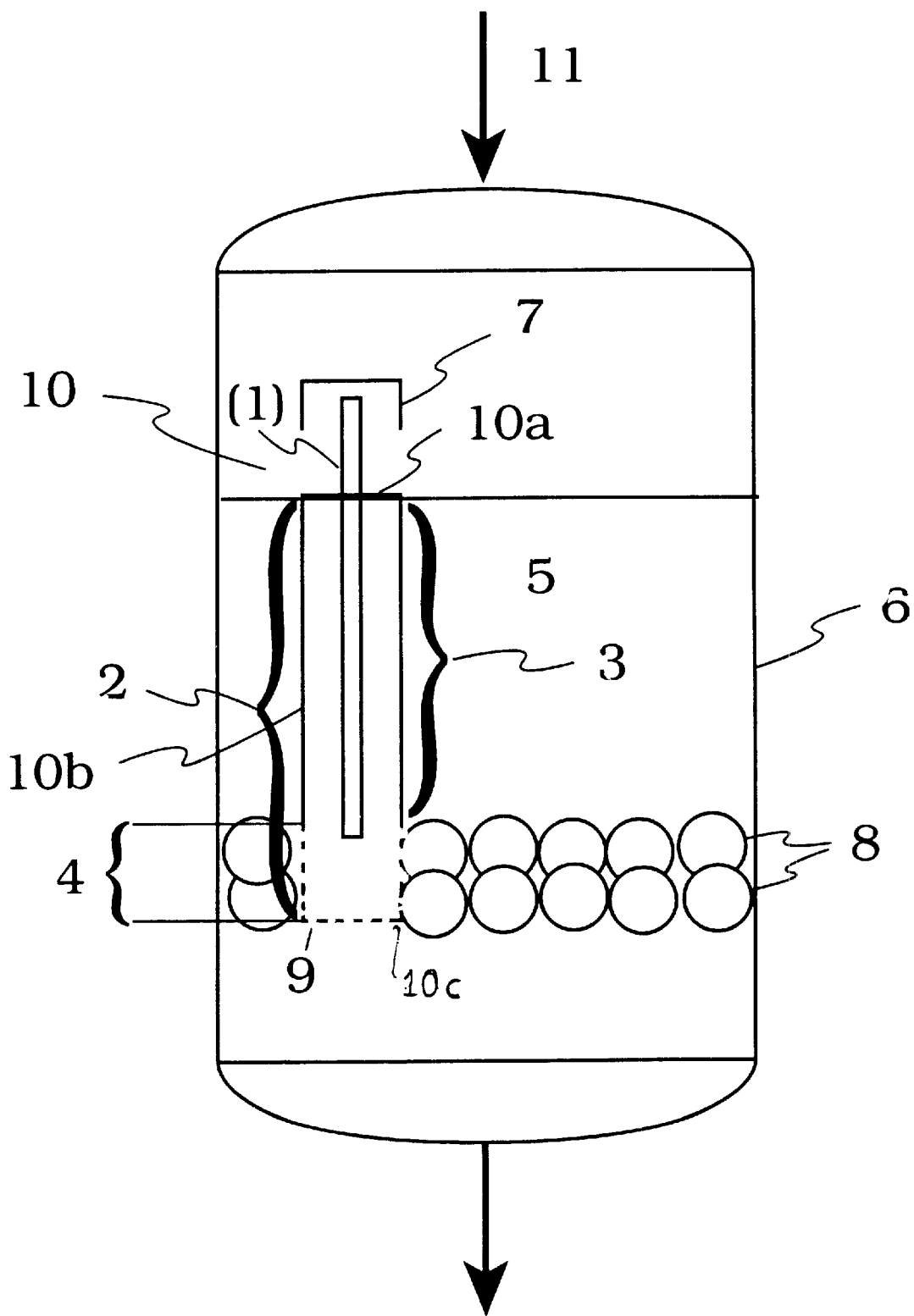
FIG. 1 shows a fouling tolerant fixed catalyst bed reactor having a bypass device for a single layer bypass, according to one embodiment of the invention.

One embodiment of the present invention provides a bypass device for bypassing a single layer of a catalyst bed when that layer fouls, the bypass device (also referred to as "single layer bypass") comprising: a first elongated hollow member or cage having a plurality of perforations or openings and a second elongated hollow member (also referred to as a "bypass tube") generally disposed within the cage and protruding above the top of the cage. The cage can be partially or fully embedded in the bed such that the section of the cage having openings therein may discharge and distribute the bypassed hydrocarbon feed to an elevation within the bed below a top fouling layer of the bed. The cage may be closed at the top except for where the first hollow elongated member extends therethrough. However, depending upon the application, the entire cage member may have openings therein, including in the top wall, side walls, and bottom wall. For example, a cage having an enclosed top wall is depicted in the embodiment of FIG. 1 with openings in the bottom wall and side walls of the lower portion of the cage. The positioning of the bypass device within the fixed catalyst bed may vary. Preferably, however, the top wall of the cage may be positioned sufficiently lower than the top surface of the catalyst bed and may also be perforated in order to allow full utilization of the top catalyst layer for foulant deposition.

One embodiment of the bypass device comprises a bypass tube in fluid communication with a perforated cage. The bypass tube extends above the top of the perforated cage. The bypass device is positioned within the fixed catalyst bed so that the top of the bypass tube extends above the fixed catalyst bed. As the top layer of the catalyst bed fouls because of impurities in the feedstock, and thus loses its permeability to flow, an increasing amount of feedstock bypasses the top layer through the tube into the perforated cage and exits from the perforated cage to a lower unfouled or less fouled layer of the catalyst bed.

In yet another embodiment of the present invention a multi-tier bypass device is provided for bypassing successive layers of a fixed catalyst bed as they foul. In one embodiment the multi-tier bypass device may comprise a perforated cage having at least one internal plate that partitions the cage into at least two compartments or chambers, an upper chamber and a lower chamber. The internal plate may include means for allowing fluid communication between the two chambers of the perforated cage. The fluid communication means may be, for example, an opening, an orifice, a tube, a spring-loaded valve, a rupture disk or any other device that allows fluid communication between the two chambers, preferably an opening, an orifice or a tube. The pressure drop across a communication device connecting a first chamber to a second chamber is designed to be sufficiently higher than the pressure drop across an unfouled catalyst layer corresponding to the first cage chamber (first catalyst layer) but lower than the pressure drop across a fouled first catalyst layer. Thus, any bypassed feedstock that enters a first cage chamber may generally exit from the side perforations of the first cage chamber into an unfouled first catalyst layer, but as the catalyst layer around the first cage chamber becomes fouled an increasing amount of the bypassed feedstock may then enter the second cage chamber through the communication device.

For example, a first communication means positioned on a first internal plate may generally provide an effective pressure drop that forces the bypassed flow that enters the first chamber to exit through perforations located on the side walls of the first chamber to a first unfouled layer of the catalyst bed corresponding to the first chamber of the cage, below the top layer of the bed. As this first layer becomes increasingly fouled the pressure drop across the side perforations becomes greater than the pressure drop across the first communication means and the bypassed feedstock flow is diverted to the second cage chamber.

The multi-tier bypass device also comprises a bypass tube. The bypass tube may protrude through the first or top chamber of the cage and may extend above the top wall of the cage. The bypass tube provides a pressure drop or flow resistance that is sufficiently higher than the pressure drop across a clean bed but lower than the pressure drop across a fouled bed. Thus the feedstock may generally go through the bypass tube only when the top layer of the bed fouls. When the top layer is not fouled the feedstock may flow through the bed without any significant bypass flow.

In yet another embodiment of the invention the cage may include a top wall, side walls, a bottom wall, a plurality of perforations on at least a portion of the side walls, and at least one internal plate dividing the interior of the cage into at least two chambers, an upper chamber and a lower chamber. The internal plate may also include a fluid communication device for allowing fluid communication between the upper and the lower chamber. The bypass tube may protrude through the top wall of the cage with an upper open end terminating above the top wall of the cage and a lower open end terminating within the upper chamber. The bypass tube provides an effective overall pressure drop to minimize bypassing when the catalyst bed is not fouled and diverts the feedstock flow to bypass a top layer of the catalyst bed and enter the upper chamber when the top layer is fouled. The fluid communication device provides an effective pressure drop to prevent the bypass flow that has entered the upper chamber from entering the lower chamber when a first catalyst layer corresponding to the upper chamber is not fouled. It also allows the bypass flow that has entered the upper chamber to enter the lower chamber through the fluid communication device when the first catalyst layer is fouled.

In yet another embodiment of the present invention the bypass tube may protrude through the top wall of the cage with an upper open end terminating above the top wall of the cage and a lower open end terminating within the lower chamber. The bypass tube may have an intermediate opening located within the upper chamber for discharging the bypass flow into the upper chamber when the catalyst layer around the upper chamber is not fouled.

Referring now to FIG. 1, there is illustrated a fouling tolerant reactor 6 having a fixed catalyst bed 5 and a "tube-cage" bypass device or apparatus 10 embedded in the catalyst bed 5, according to one embodiment of the invention. Shown is one bypass device, however, the invention may comprise a plurality of bypass devices spaced over the catalyst bed. Each bypass device 10 may extend into the catalyst bed to different bed depths.

The bypass device 10 comprises an elongated hollow member 2 (also referred to as a cage member or cage) having a top wall 10a, side walls 10b, a bottom wall 10c, and a plurality of perforations 9 disposed generally near a lower end or section or portion 4 of the cage 2. The bypass device 10 further comprises another elongated hollow member 1 (also referred to as bypass tube) disposed within cage 2 and protruding from the top wall 10a of cage 2 above the catalyst bed 5. The bypass tube 1 extends above the catalyst bed 5. The cage 2 has an upper enclosed portion (top wall and upper portion of the side walls) 3 and a lower perforated portion (bottom wall and lower portion of side walls) 4. Optionally, the bypass tube 1 may have a cap 7 over its top end or portion that extends above the catalyst bed 5. As FIG. 1 shows an optional layer of inert material 8 may be disposed within the catalyst bed 5 around the perforated section 4 of the cage 2. The elongated hollow members 1 and 2 may be tubular members with elongated hollow member 1 positioned or disposed within the elongated hollow member 2 in a concentric configuration as shown in FIG. 1. However, it should be understood that the elongated hollow members 1 and 2 can have other geometric shapes and relative configurations. Preferably, however, the cage member 2 may have a substantially larger cross section than the bypass member 1.

The elongated hollow members 1 and 2 may be tubular members with the elongated hollow member 1 positioned or disposed within the elongated hollow member 2 in a concentric configuration as shown in FIG. 1. However, it should be understood that the elongated hollow members 1 and 2 can have other geometric shapes and relative configurations. Preferably, however, the cage member (cage) 2 may have a substantially larger cross section than the bypass member 1 (bypass tube).

In operation, the bypass tube 1 may receive a portion of the feedstock and direct it into cage 2 where it is discharged through the perforations 9 of the cage 2 into a lower layer of the catalyst bed 5 that is not fouled. The top wall of the bypass device in FIG. 1 is flush with the top surface of the bed. However, positioning of the bypass device inside the bed may vary. Preferably, the bypass apparatus 10 may be inserted into the catalyst bed 5 such that cage 2 is buried into the bed. However, the positioning and dimensions of the bypass device may vary. For example, the bypass may be buried within the catalyst bed such that the bottom of the cage is contained within the catalyst bed and the bypass flow is distributed to a layer of the bed located beneath a top layer of the bed where substantial fouling occurs. Typically, fixed catalyst bed reactors that can benefit from the deployment of the inventive bypass devices include hydroprocessing and reforming reactors used in petroleum refining. However, any fixed bed using a packing of solids for contacting, filtering or reacting a feed may benefit from using the present invention bypass devices. For typical, commercial scale hydroprocessing and reforming reactors the top layer may extend from about a few inches up to about 5 feet (150 cm) from the bed's top surface. Thus, the bypass device may be designed to bypass the flow to a catalyst layer underneath the top-fouling layer.

In the embodiment shown in FIG. 1, the second elongated member extends through the first hollow elongated cage and terminates substantially at the portion of the cage having perforations therein. However, other configurations are within the scope of the invention. For example, the second elongated member may stop short of the perforations, or extend to an area within the portion of the cage having perforations. The bottom of the cage may be enclosed and only the sidewalls may have perforations in the lower portion of the cage. In one embodiment, the cage is fully buried in a catalyst bed below the surface of the bed, and the entire cage length has openings therein. In a catalyst bed where only a top layer becomes fouled, bypassed feedstock may be directed just below the fouled top layer.

The cage perforations 9 may be made by a variety of methods including constructing a portion of the cage of a mesh type material. The area of the cage having openings therein may vary and can be determined readily by a skilled artisan. For example, only the side walls may have perforations, or other areas of the cage member such as the top and bottom walls may likewise have perforations therein. Alternatively, all walls of the cage may be perforated. Also, the size of the cage perforations may vary. For example, in one embodiment of the invention the perforations may be sufficiently large to allow any small quantity of the particulates that are entrained in the bypassed flow to exit the cage and get distributed into the bed. Alternatively, the cage perforations 9 may be sufficiently small so that any bypassed foulant particulates will be retained within the cage. Generally bypass foulant particulates are small particles contained in the hydrocarbon feed that are bypassed through the bypass tube and which contribute to fouling of the catalyst bed. Typically, the cage openings may range in size from about ⅛ inch (0.31 cm) to about ½ inch (1.25 cm) wide holes or slits. The area around the cage openings may be packed with solids that are bigger in size than the catalyst particles to prevent migration of the catalyst particles into the cage through the perforations.

The tube in cage design of the present invention (tube-cage bypass) offers many advantages over prior art bypass devices. For example, the "tube-cage" bypass maintains the integrity of the catalyst particles because it allows for generally lower exit velocities of the bypassed flow into the catalyst bed. High exit velocities would generally erode the bed or cause it to slump, increase its pressure drop, and deteriorate the overall reactor performance. Other advantages exist.

The reactor 6 may be operated by introducing a feedstock 11, such as hydrocarbons, to be reacted in the catalyst bed 5 along with any suitable treat gas and chemical, as needed, such as hydrogen. The feedstock 11 can be a liquid, gas, or a mixture thereof. The reactor 6 may be operated at any suitable process conditions. Such conditions are known in the art and are generally not modified by use of the inventive bypass apparatus. The feedstock 11 may undergo any desired chemical reactions as it moves through the catalyst bed. At the beginning, when the catalyst bed 5 is clean and no foulants or only a few foulants have been deposited at the bed top, a majority of the flow may go through the catalyst bed 5 instead of the bypass apparatus 10. This is because the bypass tube 1 is sized to have a higher pressure drop relative to the clean bed, and thus the flow takes the path of least resistance through the unfouled catalyst bed 5. Generally the bypass tube 1 may be sized to provide a pressure drop from about 2 to about 100 times the pressure drop of the fouling top layer prior to fouling, preferably from about 5 to about 80 times, and more preferably from about 10 to about 50 times. As the bed top fouls during operation the resistance to flow through the bed increases causing an increasing fraction of the flow to bypass the top of the bed through the bypass apparatus 10.

For example, the pressure drop through a clean, (unfouled) top four feet layer of a catalyst bed may typically be 2 psi in a typical commercial scale, hydroprocessing reactor. For such a reactor, depending upon the operation, the bypass tubes 1 may be sized to have a flow resistance of about 5 to about 200 psi, preferably from about 10 to 160 psi, and more preferably from about 20 to about 100 psi, with total feedstock flow in the tubes 1. By employing one or more bypass devices, the pressure drop through the top four feet section of the bed may generally not exceed about 50 psi for an extended period of time. If the inventive bypass devices 10 are not used, the pressure drop can be significantly higher than 50 psi upon fouling which may necessitate a reactor shutdown or throughput reduction.

The inventive bypass apparatus may be constructed from any material compatible with the operating conditions of the reactor. For example, suitable materials may include metals such as carbon steel and stainless steel, ceramic materials, and other composite materials such as carbon fiber reinforced materials.

The bypass tube 1, through which the feedstock is bypassed, may be of any diameter or width depending upon the amount and rate of material one wishes to bypass to the bottom, unfouled layer of the catalyst bed and the desired pressure drop. Such diameters may easily be determined by the skilled artisan. For example, the diameter of the bypass tube 1 may range from about 0.25 inches (0.625 cm) to about 12 inches (30 cm), more preferably from about 0.5 inches (1.25 cm) to about 6 inches (15 cm), and most preferably from about 0.5 inches (1.25 cm) to about 3 inches (7.5). The cage 2, likewise, may be of any diameter, but is generally of a substantially greater diameter or cross-section than the bypass tube 1, in order to allow for sufficiently low exit velocities of the bypassed flow into the bed. For example, the cage diameter may range from about 3 inches (7.5 cm) to about 20 inches (50 cm), more preferably from about 4 inches (10 cm) to about 12 inches (30 cm), and most preferably from about 4 inches to about 10 inches.

One or more bypass devices may be utilized. The number of bypass devices utilized generally may depend upon the size of the reactor and the flow rate of the feedstock in the reactor. The design and number of the bypass devices is such that the bypass devices may offer higher resistance to flow than the clean beds, and less flow resistance than a fouled bed. When determining the number and location of the bypass devices, the skilled artisan may take into consideration, inter alia, localized velocities, residence times, and temperature distribution. The number and location of the bypass devices for a given reactor may be chosen to maintain the overall performance of the unit.

Section 4 of the cage 2 distributes the bypassed feedstock into the catalyst beds. The area surrounding the cage perforations 9 may include a layer of packing material 8 having a size that assists in the distribution of the bypassed feedstock through the catalyst beds. Use of particles for distribution is optional. The packing material 8 may allow any particulates flowing into the bypass apparatus 10 to be dispersed upon exiting the cage perforations 9. Suitable packing material 8 may be any inert material such as alumina balls typically used to support catalyst particles in a fixed bed. The packing material 8 could also be any other material or even catalyst particles, provided that the catalyst particles are of greater size than the perforations 9. Thus, catalyst particles, if chosen as a packing material 8, may preferably be of an appropriate size to distribute the feedstock being bypassed. Typically, the particles may range in size from about 0.25 inches (0.625 cm), to about 4 (10 cm) inches. In addition to alumina balls, several other packing materials such as those typically used in packed towers may also be used.

In a preferred embodiment of the invention, the bypass tube 1 may have a device or cap 7 at the top to facilitate separation of particulates from the bypassed hydrocarbon feed, as shown in FIG. 1. The downward moving hydrocarbon feed from the reactor inlet is forced to change its direction by the cap 7 so that the feed can move upward and then enter the bypass apparatus 10. While the flow direction of the feed is changed by the cap 7, the inertia of the particulates prevent these particulates from changing their flow direction. These particulates separate out and accumulate at the bed top. Thus, the cap 7 may remove a significant number of particulates, and minimize fouling in the interior bed sections. The separation cap 7 may generally remove the larger size particulates. Depending upon the sizes of the incoming particulates, some of the very small particulates may not get separated by separation cap 7. These very small particulates that have failed to separate may be so small in size that they may pass through the catalyst bed 5 without plugging it. Inert packing 8 that surrounds the cage perforations 9 may help disperse these small size particulates in the layer of the inert material and further minimize pressure drop buildup. In addition to a cap 7, other separation devices could also be used. Examples of suitable separation devices may include small centrifugal separators or cyclones mounted on the top of each bypass tube 1.

Figure 2:
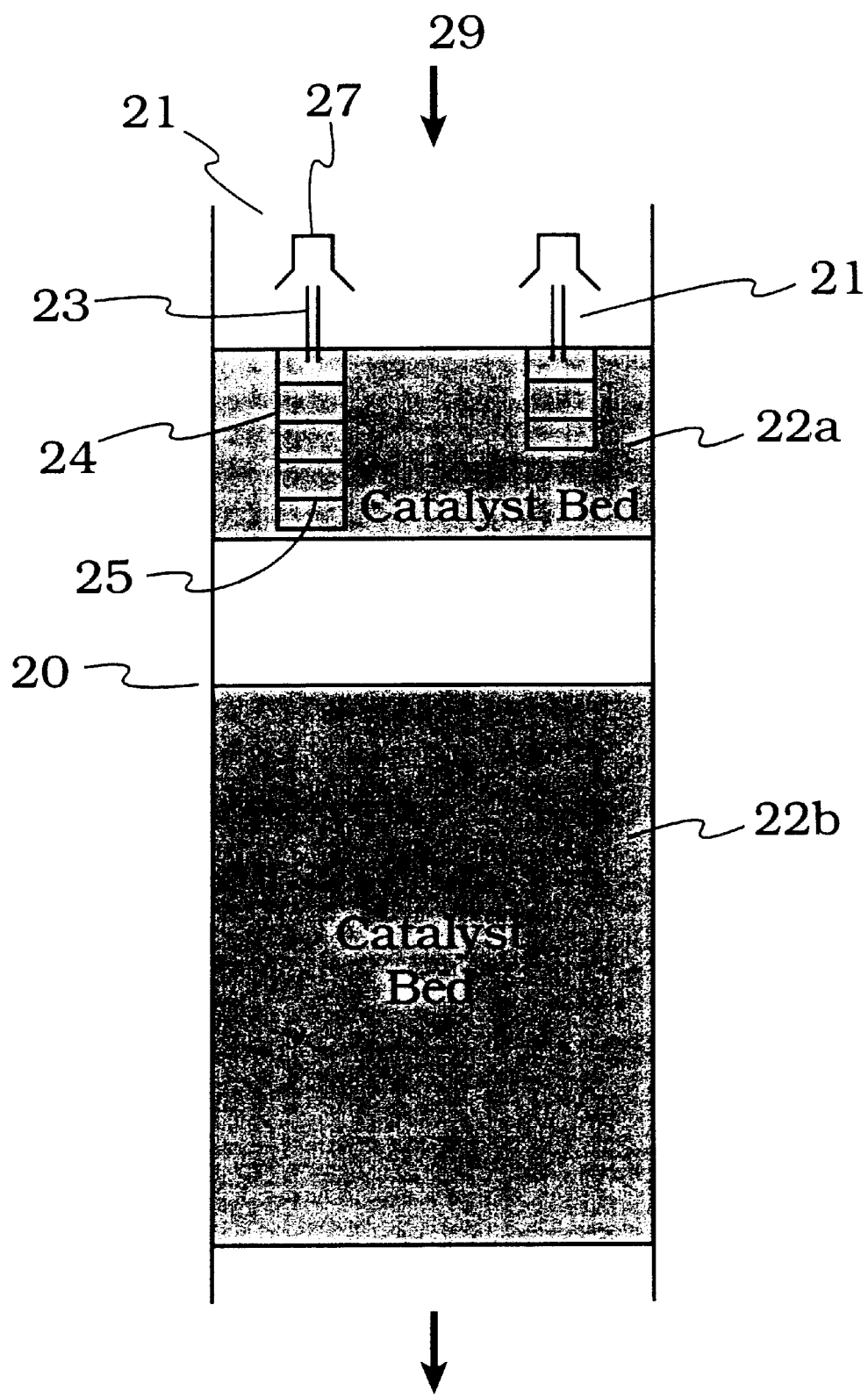
FIG. 2 shows a fouling tolerant fixed catalyst bed reactor having a multi-tier bypass device, according to another embodiment of the invention.

Referring now to FIG. 2, a side cross-sectional view of a fouling tolerant reactor 20 having two, multi-tier bypass devices 21 is provided. The reactor 20 can be any of many well-known fixed bed catalyst reactors having a single or a plurality of fixed catalyst beds. Preferably, the multi-tier bypass devices may be embedded in a first catalyst bed 22a through which feedstock passes as indicated by arrow 29. However, it should be understood that bypass devices 21 may also be embedded in a second catalyst bed 22b, if needed. The bypass devices 21 may be embedded as shown in FIG. 2 with the top wall of the cage 24 being substantially coplanar with the top surface of the catalyst bed. Preferably, however, each bypass device 21 may be totally buried in the bed 22a with the top wall of the cage member 24 below the top surface of the catalyst layer. A single bypass device 21 may be used, preferably, however, a plurality of bypass devices may be used that cover substantially the whole cross section of the catalyst bed. The cage 24 of each bypass device 21 may extend the whole depth of the catalyst bed 22a or terminate at some desirable depth within the catalyst bed 22a. The cage 24 comprises a plurality of internal plates 25 that partition the cage into a plurality of chambers that are in fluid communication with one another through an opening or some other communication means such as a tube, a rupture disc, a spring loaded valve and other (see FIG. 3). A bypass tube 23 is securely attached to the cage 24 and is in fluid communication with the first chamber of the cage 24. The length and diameter of the bypass tube 23 may vary to provide an effective pressure drop across the tube to prevent any significant bypass flow when the top layer of the bed is not fouled, but allow bypass flow when the top layer of the bed becomes fouled. A cap 27, or some other separation device may also be used.

Figure 3:
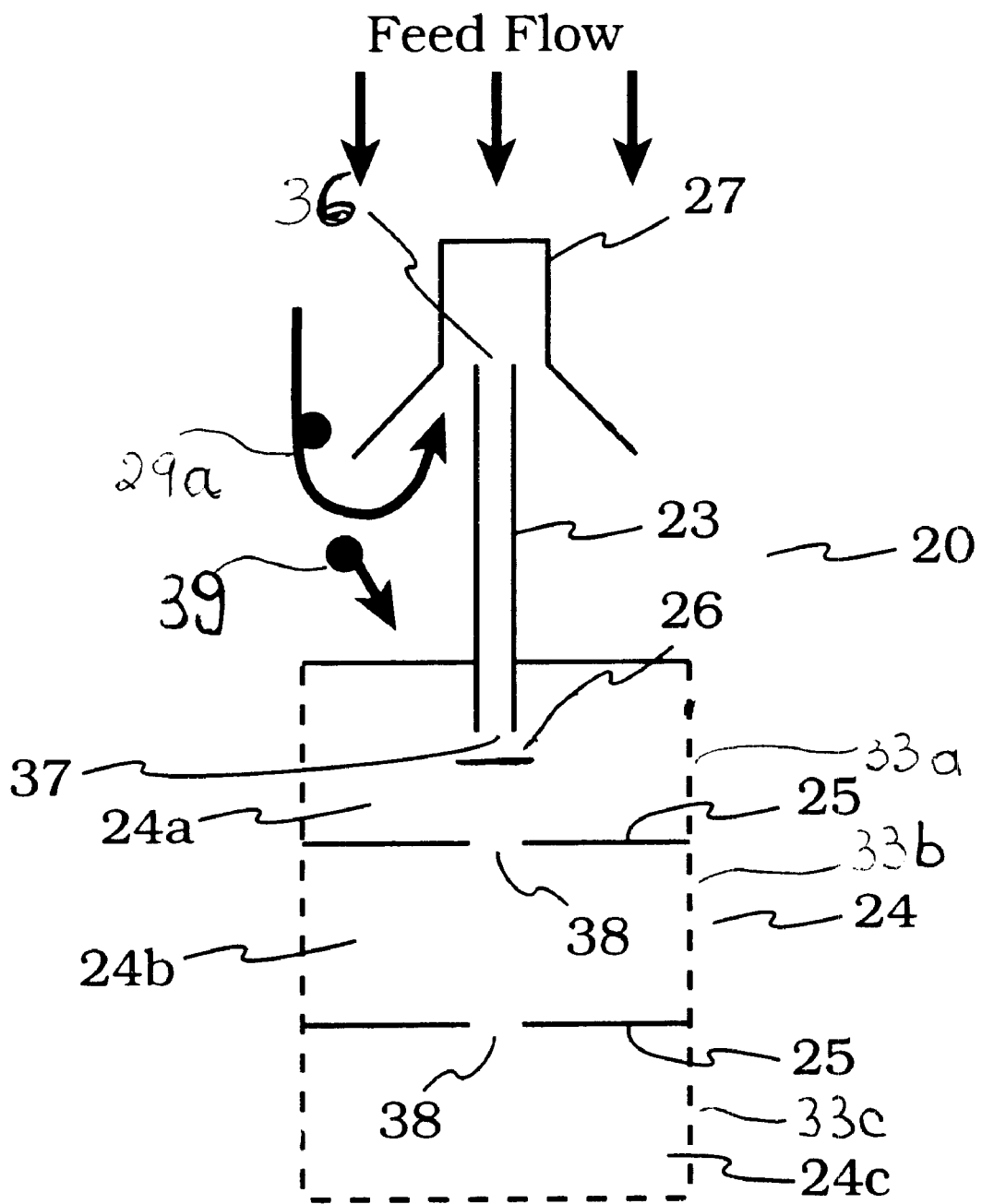
FIG. 3 shows a multi-tier bypass device according to one embodiment of the invention.

Referring to FIG. 3, one embodiment of a multi-tier bypass device 20 is provided. The multi-tier bypass device comprises a bypass tube 23 disposed within a cage 24. The cage 24 has two internal plates or walls 25 that partition the cage 24 into three chambers 24a, 24b, and 24c. The bypass tube 23 protrudes through the top wall of the cage 24 with an upper open end 36 terminating above the top wall of the cage 24 and a lower open end 37 terminating within the first chamber 24a of the cage 24. A plate 26 may be positioned near the open end 37 of the bypass tube 23 to deflect the bypass flow as it exits the bypass tube 23. Each internal plate has an opening 38 sized to provide an effective pressure drop to divert the bypass flow from one chamber to the next chamber as the catalyst layer around a chamber becomes fouled. Thus, in operation, as soon as the top catalyst layer becomes fouled, the feedstock flow will pass through the bypass tube 23 and will enter the first chamber 24a through the open end 37 of the bypass tube 23. The bypassed flow will exit the first chamber 24a through the side perforations 33a into a first catalyst layer positioned around the side walls of first chamber 24a. When the first catalyst layer fouls more of the bypass flow will pass through the first opening 38 into the second chamber 24b and out through the side perforations 33b of the second chamber 24b into a second catalyst layer corresponding to the second chamber 24b. Likewise, when the second catalyst layer fouls more of the bypass flow will be directed through the second opening 38 into the third chamber 24c and exit the cage 24 into the remaining catalyst bed through the side and bottom perforation 33c of the third chamber 24c.

For example, for a catalyst bed having a pressure drop of about 2 psi in the top four feet layer when it is not fouled, the multi-tier bypass device 20 may preferably be designed to have a pressure drop across tube 23 of from about 20 to about 80 psi, and a pressure drop across each opening 38 of from about 10 to about 40 psi, with an overall pressure drop across the bypass device 20 of from about 40 to about 160 psi.

Figure 4:
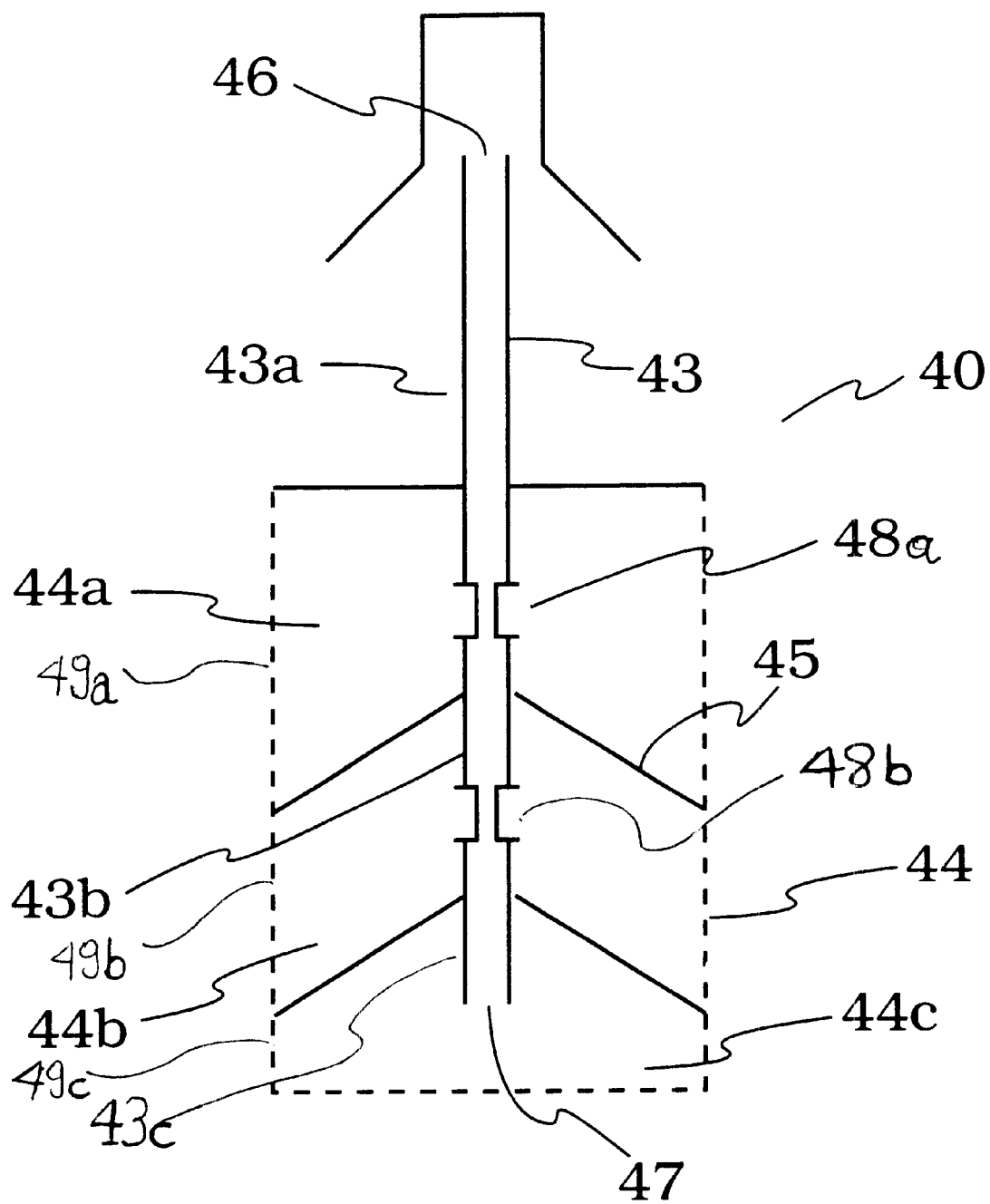
FIG. 4 shows a multi-tier bypass device according to another embodiment of the invention.

Referring to FIG. 4, another embodiment of a multi-tier device is provided comprising a bypass tube 43 disposed within a cage 44. The cage 44 has two internal walls 45 that partition the cage 44 into three chambers 44a, 44b, and 44c. The bypass tube 43 protrudes through the top wall of the cage 44 with an upper open end 46 terminating above the top wall of the cage 44 and a lower open end 47 terminating within the lower chamber 44c of the cage. The bypass tube 43 also has two intermediate openings 48 one intermediate opening 48 positioned within the first upper chamber 44a and one intermediate opening positioned within the second chamber 44b. The intermediate openings 48 are sized to provide an effective pressure drop to divert the bypass flow from one chamber to the next chamber through the bypass tube 43 as the catalyst layer around a chamber fouls. Thus, in operation, as soon as the top catalyst layer fouls, the feedstock flow will pass through the first section 43a of the bypass tube 43 and through the first intermediate opening 48 into the first chamber 44a of the cage 44 and exit through the side perforations of the first chamber 44a into a first unfouled catalyst layer corresponding to the first chamber 44a of the cage 44. When the first catalyst layer fouls the bypass flow may then pass through the second section 43b of the bypass tube 43 and the second intermediate opening 48 into the second chamber 44b of the cage 44 and exit through the side perforations of the second chamber 44b into a second unfouled catalyst layer corresponding to the second chamber 44b. Likewise, when the second catalyst layer fouls the bypass flow will be directed through the last section 43c of the bypass tube 43 into the lower chamber 44c of the cage and exit the cage 44 into the remaining of the catalyst bed through the side and bottom perforations of chamber 44c.

The bypass tube section 43b is designed to have an effective pressure drop to prevent most of the bypass flow to enter the second chamber 44b when the first catalyst layer corresponding to the first chamber 44a is not fouled but allow most of the bypass flow to enter the second chamber 44b when the first catalyst layer is fouled. Generally the bypass tube section 43b provides a pressure drop that is sufficiently higher than the overall pressure drop across the first intermediate opening 48a and the side perforations 49a of the first chamber 44a when the first catalyst layer is not fouled and it is sufficiently lower than the pressure drop across the same fluid path when the first catalyst layer is fouled.

Likewise, the bypass tube section 43c provides a pressure drop that is sufficiently higher than the overall pressure drop across the second intermediate opening 48b and the side perforations 49b of the second chamber 44b when the second catalyst layer corresponding to the second chamber 44b is not fouled. The pressure drop of the bypass tube section 43c is also sufficiently lower than the pressure drop across the same fluid path when the second catalyst layer is fouled.

Yet another aspect of the invention is directed to a method for extending the operating life of a fixed bed reactor. The method comprises partitioning the fixed bed into a top layer and a bottom layer. The pressure drop across the top layer of the fixed bed increases during processing of the feedstock due to fouling. The method further comprises introducing a hydrocarbon feedstock into the fixed bed of catalytic material, and as the top layer of the fixed bed fouls, bypassing an increasing amount of the feedstock to the bottom layer of the fixed bed, using the inventive bypass device.

Yet another embodiment of the present invention relates to a method for extending the operating life of a fixed bed reactor, the method comprising providing a fixed bed reactor, and partitioning the fixed bed into a plurality of successive layers. The method further comprises introducing a feedstock into the fixed bed, and as each successive layer fouls bypassing an increasing amount of the feedstock to the next unfouled layer. In one particular embodiment the bypassing step may include positioning at least one of the inventive multi-tier bypass devices in the fixed bed.

Many modifications of the above exemplary embodiments will naturally occur to the skilled practitioner of this art without departing from the scope of the appended claims.

What is claimed is:

1. A reactor for reacting a feedstock flowing therethrough, said reactor comprising, at least one fixed catalyst bed for reacting said feedstock; and at least one multi-tier bypass device positioned within said at least one fixed catalyst bed for bypassing successive layers of said at least one fixed catalyst bed as the layers become fouled, the multi-tier bypass device comprising:

a cage positioned within the fixed catalyst bed, the cage having a plurality of successive chambers divided from one another by means of plates, the chambers being in fluid communication with one another, each chamber having a plurality of perforations permitting fluid communication between the interior of the chamber and the catalyst bed surrounding the chamber; the fluid communication between successive chambers being sized to provide an effective pressure drop to divert fluid flow from one chamber to the next successive chamber as the catalyst layer around a chamber becomes fouled, and a bypass tube in fluid communication with at least the uppermost chamber of the cage, the bypass tube protruding from the cage above the catalyst bed for bypassing feedstock around a fouled layer of fixed catalyst bed through the bypass tube into successive cage chambers and out from the successive cage chambers in turn through the perforations into a non-fouled layer of the catalyst bed.

2. The reactor of claim 1, which includes at least one internal plate dividing the interior of the cage into at least two successive chambers including the uppermost chamber and a lower chamber, the plate including a fluid communication device for allowing fluid communication between said at least two chambers.

3. The reactor of claim 2, wherein said bypass tube protrudes through the top wall of the cage with an upper open end terminating above the top wall of the cage and a lower open end terminating within said uppermost chamber.

4. The reactor of claim 2, wherein said fluid communication device provides an effective pressure drop to prevent the fluid flow that has entered the uppermost chamber from entering the lower chamber when a first catalyst layer corresponding to the uppermost chamber is not fouled and allow the fluid flow that has entered the uppermost chamber to enter the second chamber through said fluid communication device when said catalyst layer is fouled.

5. The reactor of claim 1, in which the fluid communication between successive chambers comprises an openings in the bypass tube in the successive chambers to provide an effective pressure drop to prevent the bypass flow that has entered the uppermost chamber from entering the lower chamber when a first catalyst layer corresponding to the uppermost chamber is not fouled and allow the bypass flow that has entered the uppermost chamber to enter the second chamber through said fluid communication device when said catalyst layer is fouled.

6. The reactor of claim 2 in which the bypass tube protrudes through the top wall of the cage, with an upper end terminating above the top wall of the cage and a lower end terminating within a lower chamber and with an intermediate opening located within the uppermost chamber.

* * * * *